United States Patent
Moriya

(10) Patent No.: US 9,103,312 B2
(45) Date of Patent: Aug. 11, 2015

(54) VEHICLE CONTROL APPARATUS

(75) Inventor: Kouki Moriya, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 355 days.

(21) Appl. No.: 13/581,406

(22) PCT Filed: Feb. 25, 2011

(86) PCT No.: PCT/IB2011/000558
§ 371 (c)(1),
(2), (4) Date: Sep. 20, 2012

(87) PCT Pub. No.: WO2011/107880
PCT Pub. Date: Sep. 9, 2011

(65) Prior Publication Data
US 2013/0018570 A1    Jan. 17, 2013

(30) Foreign Application Priority Data
Mar. 3, 2010    (JP) ................. 2010-047031

(51) Int. Cl.
*F02N 11/08*    (2006.01)
*F02N 11/10*    (2006.01)
(Continued)

(52) U.S. Cl.
CPC ............ *F02N 11/0833* (2013.01); *B60K 28/12* (2013.01); *B60W 30/192* (2013.01); *B60W 10/06* (2013.01); *B60W 2540/06* (2013.01);
(Continued)

(58) Field of Classification Search
CPC ............ F02N 11/0814; F02N 11/0818; F02N 11/0833; F02N 2200/0814; B60W 30/18018; B60K 28/12; B60K 30/192; Y02T 10/48

USPC ........ 123/179.1, 179.3, 179.4; 701/112, 113
See application file for complete search history.

(56) References Cited

U.S. PATENT DOCUMENTS 5,278,452 A * 1/1994 Matsumoto et al. ......... 307/10.8
6,549,123 B1 * 4/2003 Monahan et al. .......... 340/425.5
(Continued)

FOREIGN PATENT DOCUMENTS

DE    102 11 466 C1    8/2003
DE    102 11 463 B3    1/2004
(Continued)

OTHER PUBLICATIONS

Feb. 28, 2012 Notification of Reason(s) for Refusal issued in Japanese Patent Application No. 2010-047031 (with partial translation).
(Continued)

*Primary Examiner* — Thomas Moulis
*Assistant Examiner* — Elizabeth Hadley
(74) *Attorney, Agent, or Firm* — Oliff PLC

(57) ABSTRACT

A vehicle control apparatus includes: detecting means (3) for detecting an open state or closed state of a hood of an engine room of a vehicle; control means (1) for controlling a power supply to an onboard device each time an input operation is performed on a switch (2); and drive control means (4) for starting or stopping an engine of the vehicle in accordance with whether or not a state of the vehicle satisfies a predetermined condition. The control means stops the power supply to the onboard device if the input operation is performed on the switch when the detecting means detects that the hood is open in a state where the engine has been stopped by the drive control means.

3 Claims, 3 Drawing Sheets

(51) Int. Cl.
*B60R 16/023* (2006.01)
*B60K 28/12* (2006.01)
*B60W 30/192* (2012.01)
*B60W 10/06* (2006.01)

(52) U.S. Cl.
CPC ........ *B60W 2540/12* (2013.01); *B60W 2540/14* (2013.01); *F02N 2200/0814* (2013.01); *Y02T 10/48* (2013.01)

(56) References Cited

U.S. PATENT DOCUMENTS

| | | | |
|---|---|---|---|
| 7,091,629 B2* | 8/2006 | Hawkins | 307/10.6 |
| 2004/0262995 A1* | 12/2004 | Hawkins | 307/10.6 |
| 2008/0172170 A1* | 7/2008 | Lecole et al. | 701/113 |
| 2010/0030431 A1* | 2/2010 | Potter | 701/45 |
| 2010/0305805 A1* | 12/2010 | Yamaguchi | 701/29 |
| 2011/0160985 A1* | 6/2011 | Yamaguchi | 701/112 |
| 2012/0138006 A1* | 6/2012 | Gwon et al. | 123/179.4 |
| 2012/0283935 A1* | 11/2012 | Gregori et al. | 701/112 |
| 2013/0013176 A1* | 1/2013 | Bassindale | 701/113 |
| 2015/0046072 A1* | 2/2015 | Bassindale, Brian | 701/112 |

FOREIGN PATENT DOCUMENTS

| | | |
|---|---|---|
| EP | 1 647 707 A1 | 4/2006 |
| JP | A-58-117330 | 7/1983 |
| JP | A-58-202368 | 11/1983 |
| JP | A-2000-186588 | 7/2000 |
| JP | A-2000-204996 | 7/2000 |
| JP | A-2003-254210 | 9/2003 |
| JP | A-2004-169588 | 6/2004 |
| JP | A-2006-138221 | 6/2006 |
| JP | A-2009-215961 | 9/2009 |

OTHER PUBLICATIONS

Jul. 4, 2011 International Search Report issued in International Patent Application No. PCT/IB2011/000558.
Jun. 19, 2012 International Preliminary Report on Patentability issued in International Patent Application No. PCT/IB2011/000558.

* cited by examiner

VEHICLE CONTROL APPARATUS

FIELD OF THE INVENTION

The invention relates to a vehicle control apparatus, and more particularly to a vehicle control apparatus with which the convenience of a user or a worker can be improved in a case where the user or the worker controls a power supply to a device installed in a vehicle by pressing a pushdown switch.

BACKGROUND OF THE INVENTION

Various electronic instruments are installed in a moving body such as an automobile to enable various types of vehicle control. One example of these types of vehicle control is an idling stop system. In recent years, vehicles installed with an idling stop system (also known as an eco-run system) have been put to practical use to achieve reductions in the exhaust gas and fuel consumption of vehicles having an engine.

In the control performed by the aforesaid idling stop system, the engine of the vehicle is stopped automatically when the vehicle stops at an intersection or the like (due to a red light or the like), for example. To resume travel, a driver of the vehicle depresses an accelerator pedal, depresses a clutch pedal, releases a brake pedal, or switches a shift lever to a forward travel position (a D range in the case of an automatic vehicle, for example), for example, whereby the engine automatically restarts. Note that a state in which the control (engine starting/stopping) performed by the idling stop system is underway will be referred to hereafter as an idling stop mode.

An apparatus disclosed in Japanese Patent Application Publication No. 2006-138221 (JP-A-2006-138221), for example, is available as an example of the aforesaid idling stop system.

In the apparatus disclosed in JP-A-2006-138221, an engine of a vehicle is stopped and restarted when the state of the vehicle satisfies a predetermined condition. More specifically, in the apparatus disclosed in JP-A-2006-138221, the engine is restarted from an idling stop state (an engine stoppage) when information indicating the state of the vehicle (a vehicle speed of the vehicle and so on) or information obtained in response to a driver operation (whether or not a brake or a clutch is depressed, whether or not a transmission has been operated, and so on) satisfies a preset condition.

In addition to the idling stop system described above, a push start system exists as another example of the various types of vehicle control executed by the electronic instruments installed in an automobile.

In a typical push start system, each successive time a driver carrying an electronic key (also known as a smart key) in a cabin of a vehicle presses a push button while inside the cabin, a power supply of the vehicle can be turned ON and OFF, an accessory switch (ACC) can be turned ON and OFF, an ignition switch (IG) can be turned ON and OFF, and the engine can be started and stopped.

Here, a vehicle installed with both the aforesaid idling stop system and the aforesaid push start system, for example, is envisaged. In a vehicle installed with both the idling stop system and the push start system, the engine is started and stopped automatically in the idling stop mode, as described above. However, when the engine of the vehicle stops for some reason in a state where control by the idling stop system is not underway (to be referred to simply as a normal mode hereafter), the user must press the push button to restart the engine. In other words, when the engine of the vehicle stops for some reason in the normal mode, the engine must be restarted by pressing the push button, whereas in the idling stop mode, the engine is started and stopped automatically.

Therefore, typically, when a hood of an engine room in a vehicle installed with an idling stop system such as that described above is opened during an idling stop (while the engine is stopped) in a state where control by the idling stop system is underway, the idling stop mode is canceled and the aforesaid normal mode is re-established.

Power required by the various onboard electronic instruments is typically supplied from an onboard storage battery, and therefore, during an idling stop (when the engine is stopped), a depth of discharge of the onboard storage battery (a lead storage battery, for example) increases. Hence, in the control performed by the idling stop system, the engine is occasionally restarted in order to charge the storage battery during an idling stop. Accordingly, when the hood of the engine room of the vehicle is opened during an idling stop, the idling stop mode is canceled, and in so doing, a situation in which the engine is started in order to charge the storage battery (battery), for example, while the engine room is open and an engine room inspection is underway can be prevented from occurring. As a result, the convenience of the user (worker) is not impaired.

However, when the push button is pressed with the intention of turning the power supply of the vehicle OFF while the hood of the engine room is open, the engine is started.

JP-A-2006-138221 does not take the open/closed state of the vehicle hood into account in the condition for restarting the engine from an engine stoppage and does not envisage a vehicle installed with a push start system.

SUMMARY OF INVENTION

The invention provides a vehicle control apparatus with which the convenience of a user or a worker can be improved in a case where the user or the worker controls a power supply to a device installed in a vehicle by performing an input operation on a switch.

A first aspect of the invention relates to a control apparatus for a vehicle. The control apparatus is capable of controlling a power supply to an onboard device installed in a vehicle by performing an input operation on a switch. The control apparatus includes: detecting means for detecting an open/closed state of a hood of an engine room of the vehicle; control means for controlling the power supply to the onboard device each time the input operation is performed on the switch; and drive control means starting or stopping an engine of the vehicle in accordance with whether or not a state of the vehicle satisfies a predetermined condition. If the input operation is performed on the switch when the detecting means detects that the hood is open in a state where the engine of the vehicle has been stopped by the drive control means, the control means stops the power supply to the onboard device.

With the control apparatus according to the first aspect of the invention, a situation in which the engine is started when the input operation is performed on the switch with the intention of turning the power supply of the vehicle OFF while the hood of the engine room is open and maintenance work is underway during an engine stoppage can be prevented from occurring. In other words, a vehicle control apparatus with which the convenience of a user or a worker can be improved in a case where the user or the worker controls a power supply to a device installed in a vehicle by performing an input operation on a switch can be provided.

A second aspect of the invention relates to a vehicle control method. The control method is used to control a power supply to an onboard device installed in a vehicle by performing an input operation on a switch. The control method detects an open/closed state of a hood of an engine room of the vehicle, starts or stops an engine of the vehicle in accordance with whether or not a state of the vehicle satisfies a predetermined condition, and stops the power supply to the onboard device if the input operation is performed on the switch when the hood is detected to be open in a state where the engine of the vehicle has been stopped.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A vehicle control apparatus according to an embodiment of the invention will be described below with reference to the drawings. Note that in this embodiment, a case in which the vehicle control apparatus is disposed in a vehicle (a passenger vehicle, to be referred to hereafter as a host vehicle, is envisaged) will be described.

First, a brief outline of the vehicle control apparatus according to this embodiment will be provided.

In the following description, a vehicle installed with a push start system with which a power supply of the host vehicle can be turned ON and OFF, an ACC can be turned ON and OFF, an IG can be turned ON and OFF, and an engine can be started and stopped with each successive depression of a pushdown switch (to be referred to simply as a push button hereafter) provided in a cabin of the vehicle, and an idling stop system (also known as an eco-run system) which automatically starts or stops the engine in accordance with the state of the vehicle, is envisaged as an example.

In the vehicle installed with these systems, when the engine of the vehicle is temporarily stopped by the idling stop system (when an idling stop is underway) and a hood of an engine room is opened in order to perform maintenance work, the push button may be pressed with the intention of turning the power supply of the vehicle OFF to ensure that the temporarily stopped engine is not restarted. If the engine starts when a worker presses the push button in order to turn the power supply of the vehicle OFF at this time, the convenience of the maintenance work is impaired. Hence, the vehicle control apparatus according to this embodiment is provided to ensure that the engine of the vehicle is not restarted by a single depression of the push button in a case where the push button is pressed while the hood of the engine room is open and maintenance work is underway.

Figure 1:
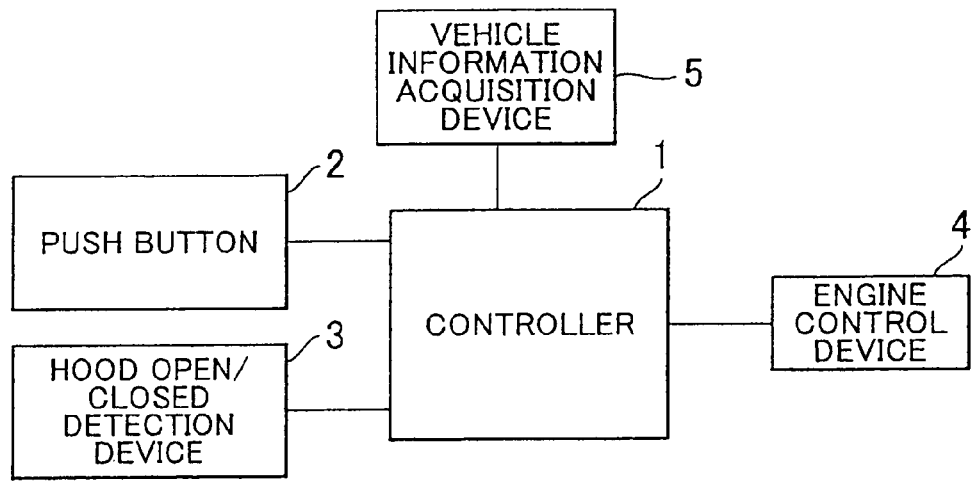
FIG. 1 is a block diagram showing an example of the constitution of a vehicle control apparatus according to an embodiment.

FIG. 1 is a block diagram showing an example of the constitution of the vehicle control apparatus according to an embodiment of the invention.

As shown in FIG. 1, the vehicle control apparatus according to this embodiment includes a controller 1, a push button 2, a hood open/closed detection device 3, and an engine control device 4. As shown in FIG. 1, a vehicle information acquisition device 5 is connected to the controller 1.

The controller 1 controls the engine control device 4 (to be described below) to start and stop the engine of the host vehicle on the basis of information output by the push button 2, the hood open/closed detection device 3, and the vehicle information acquisition device 5 and in accordance with a predetermined condition, as will be described below. In other words, the controller 1 controls the push start system and the idling stop system described above on the basis of the information output from these various devices. An operation performed by the controller 1 will be described in detail below.

The push button 2 is a pushdown switch disposed on a flank or the like of a cockpit panel in a cabin of the host vehicle and located within the cabin to be reachable by a hand of a user of the host vehicle. When the user presses the push button 2, information indicating that the push button has been pressed is output to the controller 1, whereby the power supply of the host vehicle can be turned ON and OFF, the ACC can be turned ON and OFF, the IG can be turned ON and OFF, and the engine can be started and stopped.

The hood open/closed detection device 3 is a switch or the like which, when the hood (open/close door) of the engine room is opened or closed by the user, for example, can output information indicating that the hood has been opened or closed. When the user opens the hood, for example, the hood open/closed detection device 3 outputs information indicating that the hood has been opened to the controller 1, and when the user closes the hood, for example, the hood open/closed detection device 3 outputs information indicating that the hood has been closed to the controller 1.

The engine control device 4 starts or stops the engine (not shown) installed in the host vehicle in response to an instruction from the controller 1. More specifically, the engine control device 4 includes a starter or the like for cranking the engine installed in the host vehicle and starts the engine by driving the starter in response to an instruction from the controller 1. Further, when the engine is to be stopped, the engine control device 4 halts fuel injection, for example, in response to an instruction from the controller 1.

The vehicle information acquisition device 5 detects a vehicle speed of the vehicle, a shift position of a transmission, information indicating whether or not the user (more specifically, a driver of the host vehicle) has depressed a brake or a clutch, and so on, and outputs the detection results to the controller 1.

Control of the push start system and control of the idling stop system, which are executed by the controller 1 of the vehicle control apparatus according to this embodiment on the basis of the information output by the various devices described above, will now be described with reference to FIGS. 2 and 3.

Figure 2:
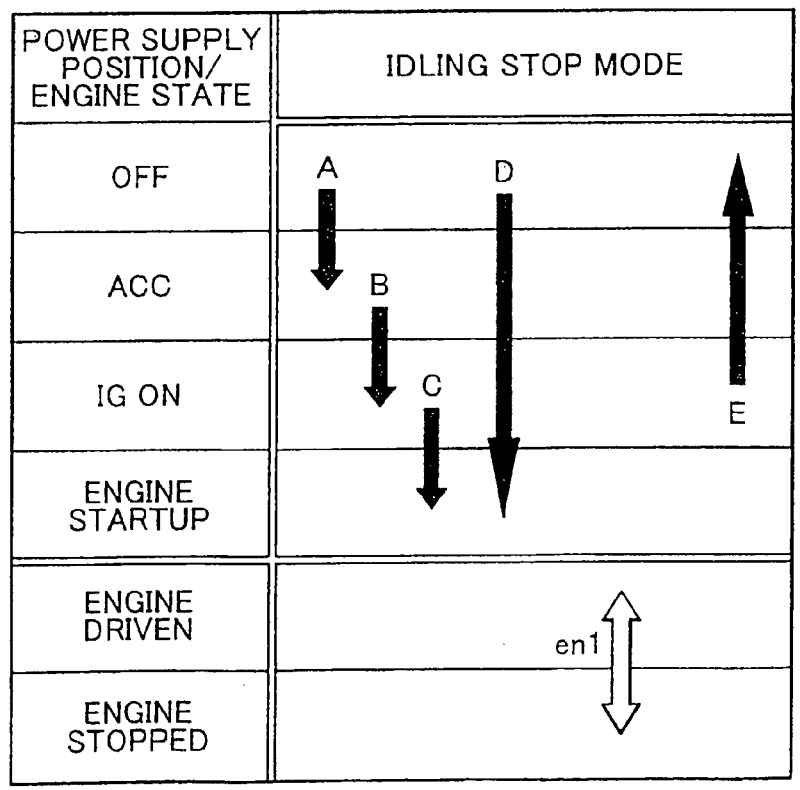
FIG. 2 is a view showing an example of engine states and power supply position transitions of a host vehicle in an idling stop mode.

FIG. 2 is a view showing an example of engine states and power supply position transitions of the host vehicle in an idling stop mode. As described above, the idling stop mode is a mode in which the engine is started and stopped automatically when a brake pedal is depressed to stop the host vehicle or the brake pedal is released, with the aim of achieving reductions in fuel consumption and the like, for example. Note that measures may be taken to ensure that the driver of the host vehicle can cancel the idling stop mode by switching a predetermined switch or the like in a case where the driver does not want the engine to be automatically started and stopped whenever the brake pedal is depressed to stop the host vehicle or the brake pedal is released. In the following description, as will be described in detail below, a state in which the idling stop mode is not established may be referred to specifically as a normal mode (a non-idling stop mode).

Typically, when the hood of the engine room in a vehicle installed with an idling stop system such as that described above is opened during an idling stop (while the engine is stopped) in a state where control by the idling stop system is underway, the idling stop mode is canceled and the normal mode is re-established.

The reason for this is that in the control performed by the idling stop system, the engine is occasionally restarted to charge a storage battery even when an idling stop is underway. Accordingly, when the hood of the engine room of the vehicle is opened during an idling stop, the idling stop mode is canceled, and in so doing, a situation in which the engine is started in order to charge the battery, for example, while the engine room is opened and an engine room inspection is underway can be prevented from occurring. As a result, the convenience of the user (worker) is not impaired.

As shown in FIG. 2, when the driver wishes to turn the ACC of the host vehicle ON, for example, in the idling stop mode, the driver presses the push button 2 once (arrow A). When the driver wishes to turn the IG of the host vehicle ON, the driver presses the push button 2 once more (arrow B). When the push button 2 is pressed once more, the engine of the host vehicle is started (arrow C). Hence, with each successive depression of the push button 2, the ACC of the vehicle can be turned ON, the IG of the vehicle can be turned ON, and the engine can be started.

Note that when the controller 1 determines on the basis of the information from the vehicle information acquisition device 5 that the driver has pressed the push button 2 while depressing the brake, for example, the controller 1 may instruct the engine control device 4 to transition directly from a power supply OFF state to engine startup (arrow D).

Hence, in the idling stop mode, after the engine of the host vehicle is started, the controller 1 performs control (arrow en1) to start and stop the engine automatically on the basis of the information output from the vehicle information acquisition device 5, or in other words controls the idling stop system. Note that when the push button 2 is pressed in a state where the engine has been automatically stopped by the controller 1 (i.e. when an idling stop is underway), the power supply turns OFF (arrow E).

Next, referring to FIG. 3, the engine states and power supply position transitions of the host vehicle in the normal mode (the non-idling stop mode) will be described. FIG. 3 is a view showing an example of the engine states and power supply position transitions of the host vehicle in the normal mode (the non-idling stop mode).

Figure 3:
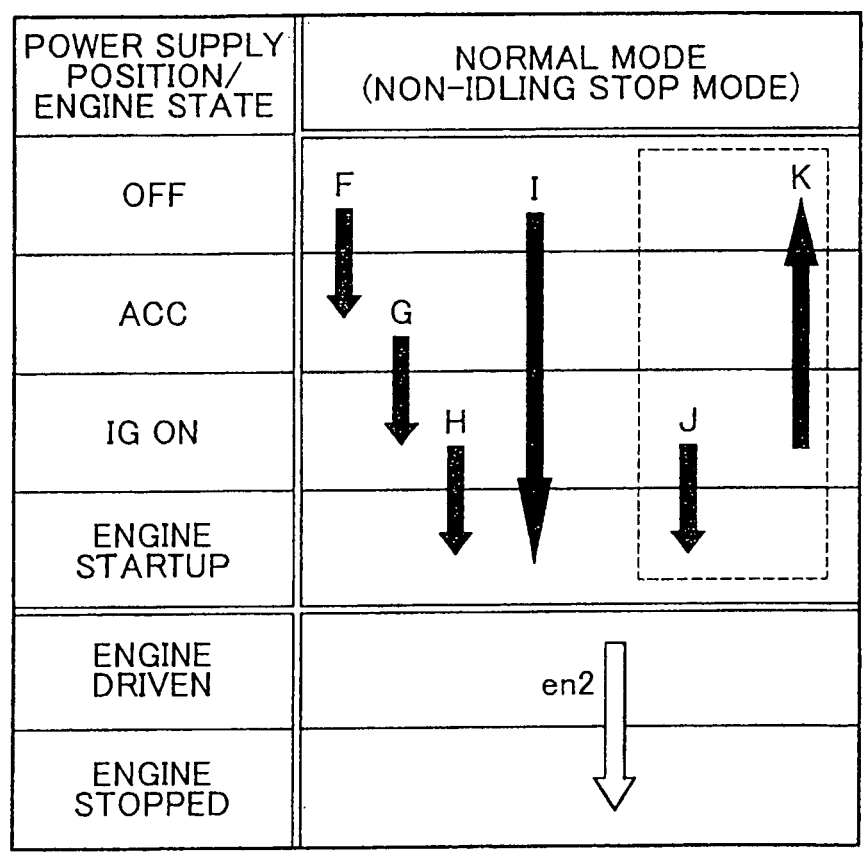
FIG. 3 is a view showing an example of the engine states and power supply position transitions of the host vehicle in a normal mode.
Figure 4:
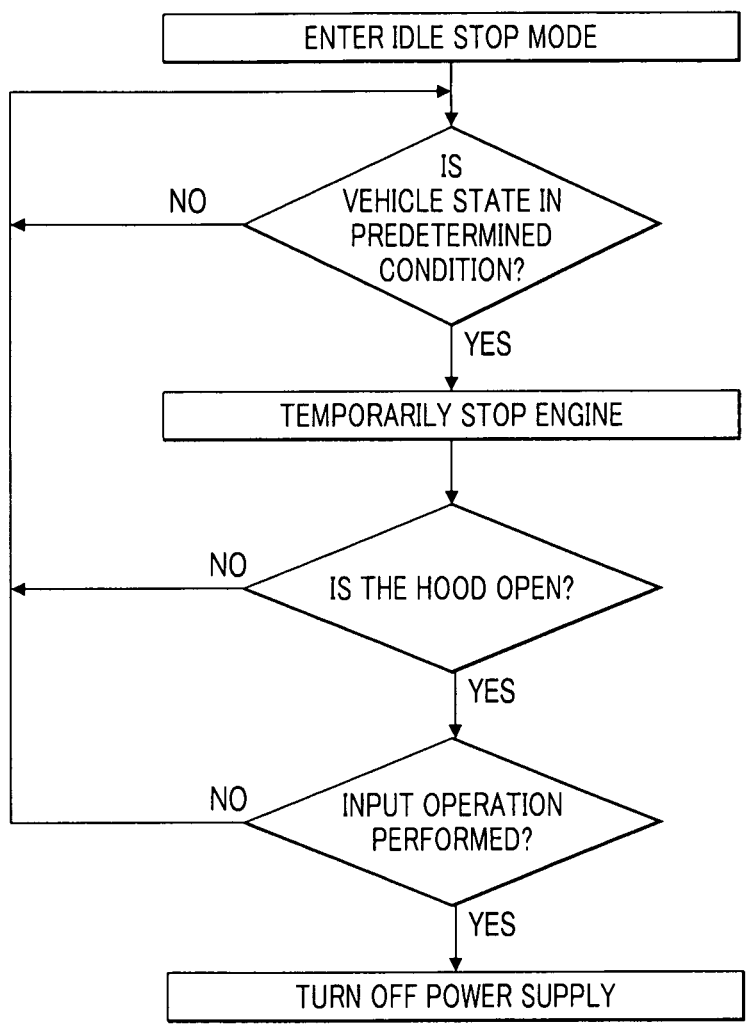
FIG. 4 is a flowchart of the method according to one embodiment.

Similar description to that of FIG. 2 has been omitted from the description of FIG. 3. More specifically, an arrow F, an arrow G, an arrow H, and an arrow I in FIG. 3 correspond to the arrow A, the arrow B, the arrow C, and the arrow D in FIG. 2, respectively.

FIG. 3 differs from FIG. 2 in a manner to be described below. Further, a particular feature of the normal mode (non-idling stop mode) established by the controller 1 of the vehicle control apparatus according to this embodiment is indicated by a dotted line in FIG. 3.

Firstly, the controller 1 does not perform control to start and stop the engine automatically on the basis of the information output by the vehicle information acquisition device 5, or in other words does not control the idling stop system. More specifically, when the engine of the host vehicle stops (arrow en2) for some reason (for example, when a clutch timing is not correct in a manual transmission (MT) vehicle or the like), the engine must be restarted by pressing the push button 2 (arrow J).

When the engine is stopped, the controller 1 obtains the information output by the hood open/closed detection device 3. When the controller 1 determines from the information output by the hood open/closed detection device 3 that the hood of the host vehicle is open and the push button 2 is pressed while the engine is stopped, the power supply of the host vehicle is turned OFF (arrow K).

To summarize the above, when the hood is opened in a case where the engine of the vehicle has been temporarily stopped by the idling stop system (when an idling stop is underway), the controller 1 shifts to the normal mode. When the push button 2 is pressed at this time in a vehicle including the control apparatus according to the related art, the engine is started, as shown by the arrow J. When an operation is performed as shown by the arrow K, however, the power supply of the vehicle is turned OFF (as indicated by the location surrounded by the dotted line in FIG. 3). Hence, when a worker opens the hood during an idling stop (while the engine is stopped) in order to inspect the engine room, for example, the engine is not started, and as a result, the convenience of the worker can be improved.

Note that in the above example, a vehicle installed with a push start system and an idling stop system is envisaged, but the invention is not limited thereto, and in a vehicle not installed with an idling stop system, for example, the power supply may be turned OFF when the push button 2 is pressed once while the engine of the host vehicle is stopped and the hood is open.

Hence, with the vehicle control apparatus according to this embodiment, the convenience of a user or a worker can be improved in a case where the user or the worker controls a power supply to a device installed in a vehicle by pressing a pushdown switch.

In this embodiment, a vehicle employing a pushdown switch is envisaged, but the invention is not limited thereto and may be applied to a vehicle employing any switch having a similar function to a pushdown switch.

The vehicle control apparatus according to the invention may be used as a vehicle control apparatus or the like with which the convenience of a user or a worker can be improved in a case where the user or the worker controls a power supply to a device installed in a vehicle by pressing a pushdown switch.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vehicle control apparatus capable of controlling a power supply to an onboard device installed in a vehicle by performing an input operation on a switch, the apparatus comprising:

detecting means for detecting an open state or closed state of a hood of an engine room of the vehicle;

control means for controlling the power supply to the onboard device each time the input operation is performed on the switch; and drive control means for starting or stopping an engine of the vehicle in an idling stop mode in accordance with whether or not a state of the vehicle satisfies a predetermined condition, wherein, the control means is configured to turn off the power supply to the vehicle if the input operation is performed on the switch when the detecting means detects that the hood is open in a state where the engine of the vehicle is temporarily stopped in the idling stop mode by the drive control means;

wherein the switch is a pushdown switch that performs input when pressed by a user.

2. A vehicle control apparatus capable of controlling a power supply to an onboard device installed in a vehicle by performing an input operation on a switch, the apparatus comprising:

a detecting portion that detects an open/closed state of a hood of an engine room of the vehicle;

a control portion that controls the power supply to the onboard device each time the input operation is performed on the switch; and a drive control portion that starts or stops an engine of the vehicle in an idling stop mode in accordance with whether or not a state of the vehicle satisfies a predetermined condition, wherein, the control portion is configured to turn off the power supply to the vehicle if the input operation is performed on the switch by a user when the detecting portion detects that the hood is open in a state where the engine of the vehicle has been temporarily stopped in the idling stop mode by the drive control portion.

3. A vehicle control method for controlling a power supply to an onboard device installed in a vehicle by performing an input operation on a switch, the method comprising:

detecting an open state or closed state of a hood of an engine room of the vehicle;

automatically starting or stopping an engine of the vehicle in an idling stop mode in accordance with whether or not a state of the vehicle satisfies a predetermined condition; and turning off the power supply to the vehicle if the input operation is performed on the switch by a user when the hood is detected to be open in a state where the engine of the vehicle has been temporarily stopped in the idling stop mode.

* * * * *